US008122056B2

(12) United States Patent
Ames et al.

(10) Patent No.: US 8,122,056 B2
(45) Date of Patent: Feb. 21, 2012

(54) INTERACTIVE AGGREGATION OF DATA ON A SCATTER PLOT

(75) Inventors: Glen Anthony Ames, Mountain View, CA (US); David A. Burgess, Menlo Park, CA (US); Joshua Ethan Miller Koran, Mountain View, CA (US); Sundara Raman Rajagopalan, Sunnyvale, CA (US); Amit Umesh Shanbhag, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 513 days.

(21) Appl. No.: 11/804,196

(22) Filed: May 17, 2007

(65) Prior Publication Data

US 2008/0288445 A1  Nov. 20, 2008

(51) Int. Cl.
*G06F 17/30* (2006.01)
(52) U.S. Cl. ........................ 707/791; 715/718
(58) Field of Classification Search .................. None
See application file for complete search history.

(56) References Cited

U.S. PATENT DOCUMENTS

| | | | |
|---|---|---|---|
| 5,308,058 A | 5/1994 | Mandel et al. | |
| 5,328,169 A | 7/1994 | Mandel | |
| 5,342,034 A | 8/1994 | Mandel et al. | |
| 5,358,238 A | 10/1994 | Mandel et al. | |
| 5,390,910 A | 2/1995 | Mandel et al. | |
| 5,435,544 A | 7/1995 | Mandel | |
| 5,535,324 A | 7/1996 | Alvarez et al. | |
| 5,547,178 A | 8/1996 | Costello | |
| 5,550,964 A | 8/1996 | Davoust | |
| 5,960,435 A * | 9/1999 | Rathmann et al. ................. 1/1 |
| 6,278,989 B1 | 8/2001 | Chaudhuri et al. | |
| 6,351,754 B1 | 2/2002 | Bridge, Jr. et al. | |
| 6,438,552 B1 | 8/2002 | Tate | |
| 6,499,032 B1 | 12/2002 | Tikkanen et al. | |
| 6,505,206 B1 | 1/2003 | Tikkanen et al. | |
| 6,529,217 B1 | 3/2003 | Maguire et al. | |
| 6,549,910 B1 | 4/2003 | Tate | |
| 6,865,567 B1 | 3/2005 | Oommen et al. | |
| 6,906,717 B2 | 6/2005 | Couckuyt et al. | |
| 6,907,422 B1 | 6/2005 | Predovic | |
| 7,197,513 B2 | 3/2007 | Tessman et al. | |
| 7,209,924 B2 | 4/2007 | Bernhardt et al. | |
| 7,246,014 B2 | 7/2007 | Forth et al. | |
| 7,342,929 B2 | 3/2008 | Bremler-Barr et al. | |
| 7,562,058 B2 | 7/2009 | Pinto et al. | |
| 2002/0077997 A1* | 6/2002 | Colby et al. ................. 707/1 |
| 2002/0141643 A1 | 10/2002 | Jaeger | |
| 2003/0076848 A1 | 4/2003 | Bremler-Barr et al. | |
| 2004/0002980 A1 | 1/2004 | Bernhardt et al. | |
| 2005/0068320 A1 | 3/2005 | Jaeger | |

(Continued)

OTHER PUBLICATIONS

U.S. Appl. No. 11/752,036, filed May 22, 2007.

(Continued)

*Primary Examiner* — Jean B Fleurantin
*Assistant Examiner* — Anteneh Girma
(74) *Attorney, Agent, or Firm* — Weaver Austin Villeneuve and Sampson LLP

(57) ABSTRACT

A computer-implemented method, which comprises the following: aggregating a plurality of records in accordance with an aggregation specification, wherein the records are part of a dimensionally-modeled fact collection; graphically representing the records in un-aggregated form; graphically representing the records in aggregated form; and causing the graphical representation of the records to be switched between aggregated form and un-aggregated form based on a user indication.

16 Claims, 5 Drawing Sheets

U.S. PATENT DOCUMENTS

| | | |
|---|---|---|
| 2005/0240456 A1 | 10/2005 | Ward et al. |
| 2006/0028470 A1* | 2/2006 | Bennett et al. ............... 345/440 |
| 2006/0036639 A1 | 2/2006 | Bauerle et al. |
| 2006/0085561 A1 | 4/2006 | Manasse et al. |
| 2007/0244849 A1 | 10/2007 | Predovic |
| 2008/0016041 A1 | 1/2008 | Frost et al. |
| 2008/0104101 A1 | 5/2008 | Kirshenbaum et al. |

OTHER PUBLICATIONS

U.S. Appl. No. 11/752,048, filed May 22, 2007.

U.S. Appl. No. 11/804,233, filed May 16, 2007.

Office Action in U.S. Appl. No. 11/752,036, mailed Apr. 20, 2009.

Office Action from U.S. Appl. No. 11/752,048, dated Sep. 22, 2009.

Final Office Action from U.S. Appl. No. 11/752,036, dated Nov. 4, 2009.

Office Action U.S. Appl. No. 11/804,233, dated Mar. 8, 2010.

K. L. Wu, P.S. Yu, "Range-Based Bitmap Indexing for High Cardinality Attributes with Skew," Computer Software and Applications Conference, Annual International, pp. 61, 22nd International Computer Software and Application Conference, 1998.

Office Action U.S. Appl. No. 11/804,233, dated Sep. 1, 2010.

Notice of Allowance dated May 10, 2010, U.S. Appl. No. 11/752,048.

* cited by examiner

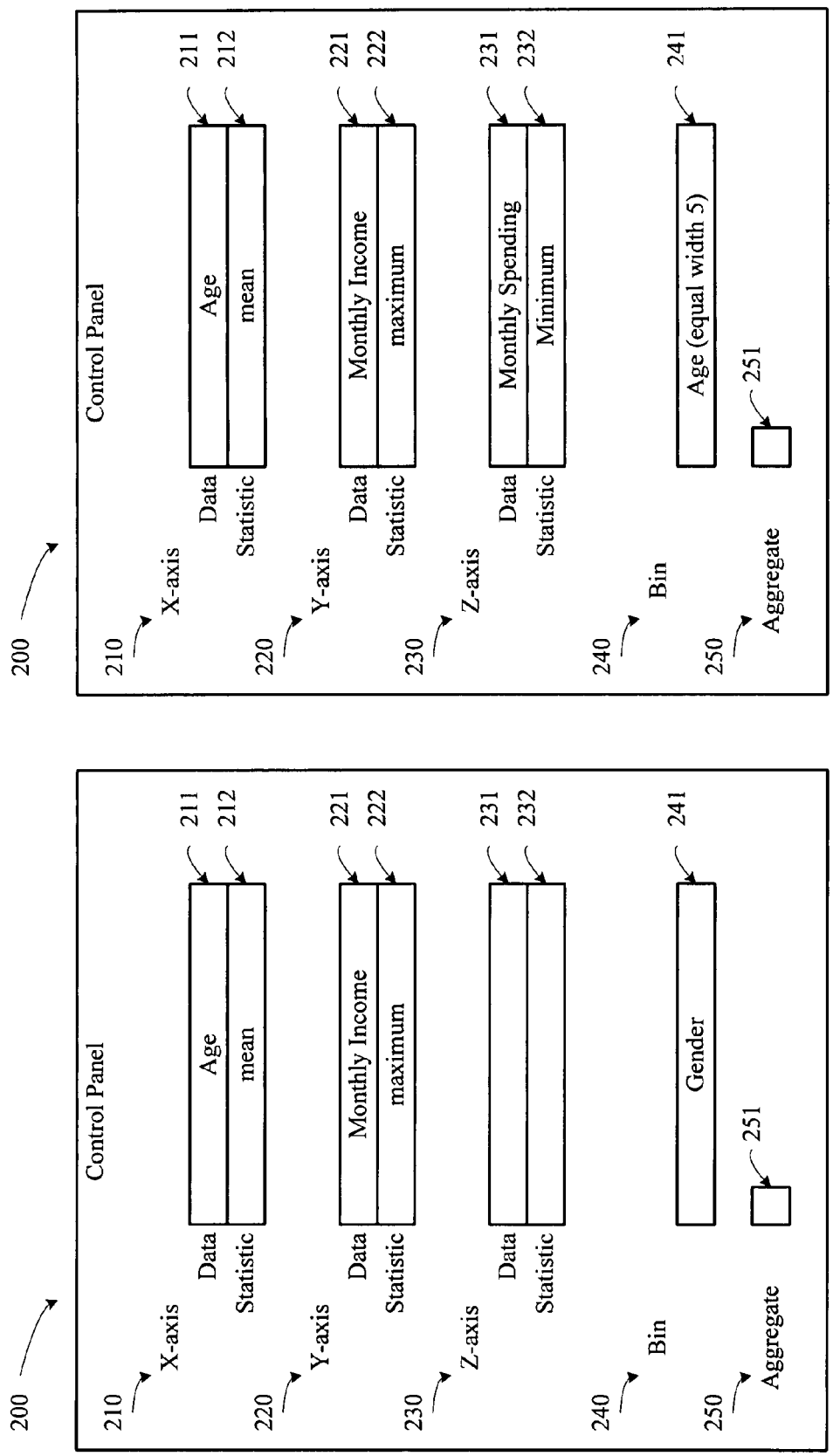

INTERACTIVE AGGREGATION OF DATA ON A SCATTER PLOT

BACKGROUND OF THE INVENTION

1. Field of the Invention

The present invention relates to analyzing the entire set or a subset of multi-dimensional records from a dataset, where the dataset represents a dimensionally-modeled fact collection. More specifically, the present invention relates to switching between graphically representing the multi-dimensional records in either aggregated or un-aggregated form.

2. Background of the Invention

When interacting with and/or analyzing datasets, where, for example, each dataset may contain a million or more multi-dimensional records, it can be difficult, impractical, and even impossible for users to consider the entire datasets all at once. Moreover, it may be impractical or unnecessary for the users to analyze each individual record separately. Sometimes, the users may prefer to consider the records or a portion of the records in aggregated form. For example, analyzing records in aggregated form may help the users better understand the dispersion of the data values in the multiple dimensions.

One way for the users to work with the multi-dimensional records is to display the information contained in the records textually, such as in a spread sheet. However, performing aggregation on the records may be slow, especially when the number of records is large, and may require several steps before the results may be obtained. In addition, it is not convenient to switch the textual display of the multi-dimensional records back and forth between aggregated and un-aggregated form or between different types of aggregation for easy comparison.

Accordingly, what is needed are systems and methods to address the above-identified problems.

SUMMARY OF THE INVENTION

Broadly speaking, the present invention relates to switching between graphically representing the entire set or a subset of the multi-dimensional records from a dataset in aggregated and un-aggregated form, where the dataset represents dimensionally-modeled fact collection.

In one embodiment, a computer-implemented method is provided, which comprises the following: aggregating a plurality of records in accordance with an aggregation specification, wherein the records are part of a dimensionally-modeled fact collection; graphically representing the records in un-aggregated form; graphically representing the records in aggregated form; and causing the graphical representation of the records to be switched between aggregated form and un-aggregated form based on a user indication.

In another embodiment, a computer-implemented method is provided, which comprises the following: aggregating a plurality of records in accordance with an aggregation specification, wherein the records are part of a dimensionally-modeled fact collection, and wherein the aggregation specification comprises an aggregation base that defines at least one group into which the records are divided for aggregation and at least one aggregation type; graphically representing the records in un-aggregated form; graphically representing the records in aggregated form; causing the graphical representation of the records to be switched between aggregated form and un-aggregated form based on a user indication; and graphically distinguishing the records represented in aggregated form in accordance with the aggregation base.

In another embodiment, a computer program product comprising a computer-readable medium having a plurality of computer program instructions stored therein is provided. The plurality of computer program instructions are operable to cause at least one computing device to: aggregate a plurality of records in accordance with an aggregation specification, wherein the records are part of a dimensionally-modeled fact collection; graphically represent the records in un-aggregated form; graphically represent the records in aggregated form; and cause the graphical representation of the records to be switched between aggregated form and un-aggregated form based on a user indication.

These and other features, aspects, and advantages of the invention will be described in more detail below in the detailed description and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2A-2B illustrate a sample user interface that enables the user to control the representation of the multi-dimensional records from a dataset.

DETAILED DESCRIPTION OF THE INVENTION

Figure 1:
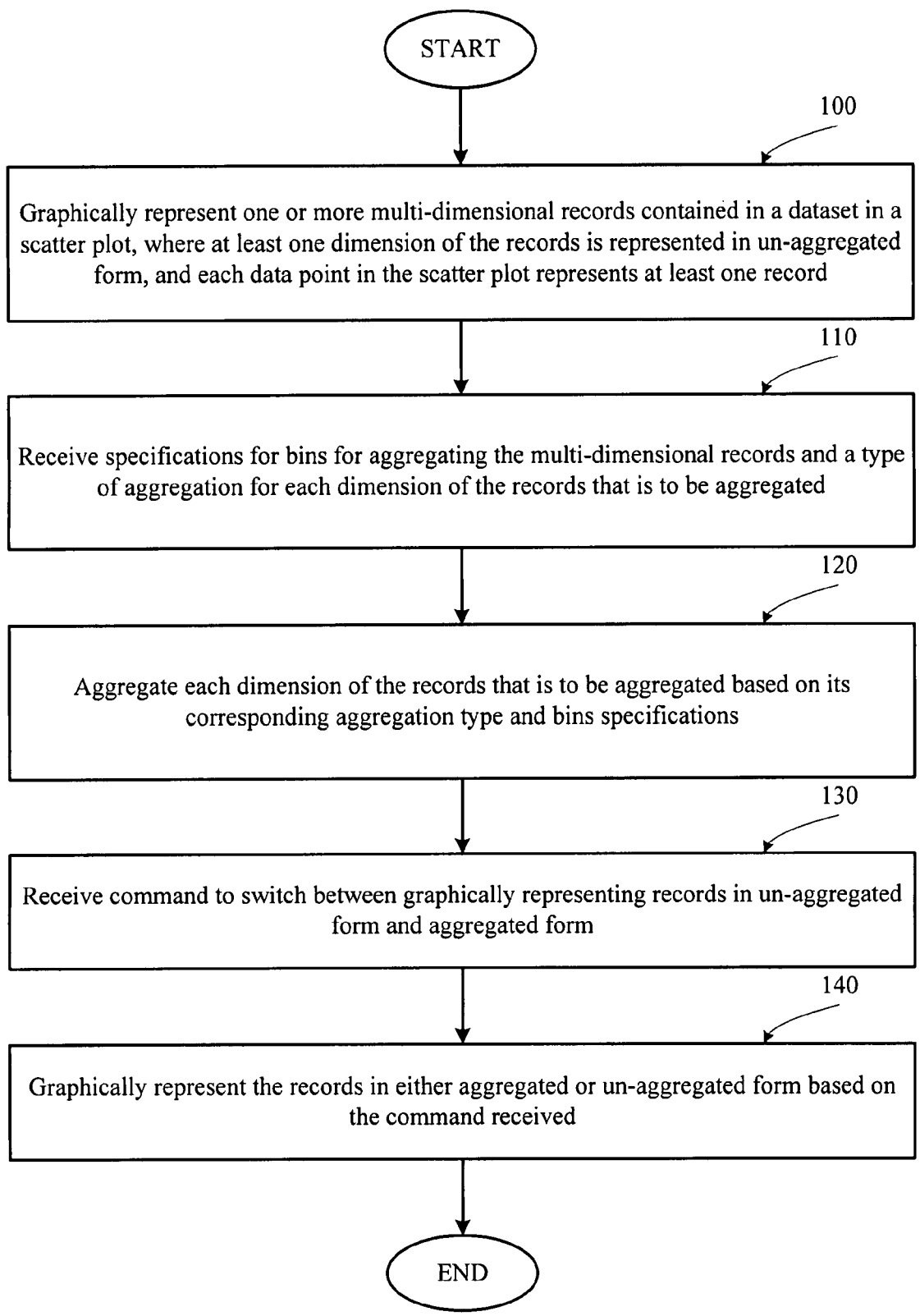
FIG. 1 is a flowchart of a method that enables a user to cause to switch between graphically representing multi-dimensional records from a dataset in un-aggregated and aggregated format.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. In addition, while the invention will be described in conjunction with the particular embodiments, it will be understood that it is not intended to limit the invention to the described embodiments. To the contrary, it is intended to cover alternatives, modifications, and equivalents as may be included within the spirit and scope of the invention as defined by the appended claims.

Businesses and other types of institutions or entities often collect factual-based data for various purposes, such as analyzing market trends, planning for business growth, conducting targeted advertisements, etc. For example, a business may collect various types of information about its customers, such as the customers' age, gender, spending habit, buying power, preferred products, etc. Alternatively, a business may collect factual data about individual business transactions. Often, the amount of factual data collected may be quite large. It is not unusual for a large dataset to contain one million or more multi-dimensional records, where each record represents a customer, a business transaction, an entity, etc. Each record may comprise multiple data values, where each data value represents a particular piece of factual information within the record.

For ease of use, the records in a dataset may be organized as, or otherwise accessible, according to a dimensional data model, such as a table. The following is a sample representation of such a table.

TABLE 1

| Customer ID | Age | Gender | Geographical Location | Monthly Income | Monthly Spending |
| --- | --- | --- | --- | --- | --- |
| A | 31 | M | CA | $ 7,500 | $1,200 |
| B | 45 | F | CA | $11,000 | $2,000 |
| C | 27 | F | NY | $ 6,500 | $1,500 |
| D | 18 | M | WA | $ 3,200 | $1,300 |
| E | 55 | F | CO | $ 5,000 | $2,200 |

In the example shown in Table 1, each row of the table represents a single record, and in this case, each record represents a customer, identified by a unique customer ID (as shown in the first column). Alternatively in another example, each record/row may be a business transaction or an entity. Each column of the table represents a different dimension of the records, such as a category or a type of data (e.g., age, gender, monthly income, etc.). Inside the cells of the table are the specific data values, each value representing a particular piece of factual information about the corresponding record (e.g., customer or transaction) in a corresponding dimension (e.g., category or characteristic), and a data value may either be a text, a number, or a combination of both. For example, the first row of Table 1 describes a customer whose customer ID is "A." Customer "A" is aged 31, a male, located in California, and has an annual income of $75,000 and a monthly spending amount of $1,200. The entire table is a collection of facts, and such collection of facts may be referred to as a dimensionally-modeled fact collection.

When working with large datasets, where, for example, each dataset may comprise a million or more such multi-dimensional records, it may be impractical, even impossible, to display all the multi-dimensional records textually. Instead, it can be more convenient to represent the records graphically using various graphical formats depending on user preferences. For example, a scatter plot may be used to graphically represent the records shown in Table 1, with each axis representing a particular dimension (column) and each data point representing at least one record (row). Users may then interact with the data points in the scatter plot graphically (e.g., using a mouse or other method to interact with the graphical display), such as selecting a subset of data points of particular interest, which, in effect, causes the corresponding records represented by these data points to be selected. Furthermore, representing the records graphically may enable the users to quickly identify related records, anomalous records, or records of particular interest, so that users may quickly select a subset of records for further analysis.

The inventors have realized that it would be useful to enable the users to interactively switch between graphically representing the multi-dimensional records in un-aggregated/raw form and aggregated form in a quick and easy manner. In addition, it would be useful to enable the users to interactively switch between graphically representing the multi-dimensional records in different types of aggregated form for easy comparison by the users.

FIG. 1 is a flowchart of a method that enables a user to switch between graphically representing multi-dimensional records from a dataset in un-aggregated and aggregated format. In one embodiment, optionally at 100, one or more multi-dimensional records from a large dataset are graphically represented in a scatter plot. Axes, colors, sizes, shapes, and other graphical characteristics may be used to graphically represent different dimensions or categories (e.g. columns of Table 1) of the records. The data points in the scatter plot may be used to represent the individual records (e.g., rows of a table).

The data values of each dimension of the records may be graphically displayed in their raw form or in aggregated form depending on user preferences. If the data values are displayed in raw form, then each data point in the scatter plot represents one record. If the data values are displayed in aggregated form, then each data point represents at least one record aggregated together.

It is not necessary for all the records or all the dimensions of the records of the dataset to be displayed at once in the scatter plot. Instead, the user may choose to display all the records (e.g., rows of Table 1) of the dataset or a portion of the records. Similarly, users may choose to display all the dimensions (e.g., columns of Table 1) of the records or a subset of the dimensions. Furthermore, it is possible for the same dimension of the records to be displayed using more than one type of graphical characteristics. For example, the user may choose to represent a particular dimension (e.g., the "Monthly Spending" column in Table 1) using one of the axes (e.g. x-axis) and color at the same time.

It is not necessary to always graphically represent the multi-dimensional records in un-aggregated form first. However, representing the multi-dimensional records graphically in un-aggregated form may provide a convenient way to help the user to specify the aggregation specification (described below in 110 in more detail). In another embodiment, the records may not be graphically represented in un-aggregated form and the user may specify the aggregation specification without the aid of the graphical representation of the records.

At 110, the user may specify bins or groups for aggregating the data values of those dimensions of the records that the user wishes to aggregate and a type of aggregation for each of those dimensions. In the case where a graphical representation of the records have been provided, the user may choose which dimension to aggregate and the aggregation type for that dimension with the help of the graphical representation of the records. For example, the user may enter bins and aggregation types manually, choose from a list of pre-defined bins and aggregation types, or user other input methods. Alternative, if the user chooses not to customize bins and aggregation types, default bins and aggregations types may be provided and used for aggregation.

The bins or groups define which groups of records should be aggregated together. For the example shown in Table 1, the user may choose to aggregate the records for all male customers together and aggregate the records for all female customers together. Thus, in this case, there are two groups for aggregation: a male group and a female group. Alternatively, the user may choose to aggregate the records based on the customers' geographical locations. For the example shown in Table 1, there are four groups for aggregation because the customers in Table 1 are located in four different states: a group for California (CA), a group for New York (NY), a group for Washington (WA), and a group for Colorado (CO).

Dimensions that have numerical data values may also be used as bins or groups. The user may define a numerical range for each group. For example, in Table 1, the "age" dimension may be used as group basis for aggregation. The user may specify 4 groups, with the first group for customers aging between 20 and 29, the second group for customers aging between 30 and 39, the third group for customers aging between 40 and 49, and the fourth group for customers aging between 50 and 59. Alternatively, the user may choose other method to define the group ranges, such as equally dividing the customer ages, or specifying the upper and lower boundaries for each group. In other words, the user may choose any dimension in the dataset as bin or group basis for aggregation and specify bin or group ranges in any way based on user preference.

In addition, the user may specify the type of aggregation for each dimension of the records whose data values the user wishes to aggregate depending on user preference. For example, the user may choose from aggregation types such as sum (the sum of all selected data points), count (the total number of selected data points), median (the median value among selected data points), minimum (the minimum value among the selected data points), maximum (the maximum value among the selected data points), mean (the mean value of all the selected data points), count greater than 0 (the total number of selected data points whose value is greater than 0), etc. Of course, two or more dimensions may be aggregated in the same way.

At 120, each dimension of the records whose data values the user wishes to aggregate is aggregated based on its corresponding aggregation type and group ranges specified by the user.

In addition, at 130, the user may choose to have the records represented graphically in either un-aggregated form or aggregated form. This enables the user to easily compare the records between their un-aggregated form and aggregated form. The user may provide a command to indicate which display type is preferred. At 140, the multi-dimensional records are represented graphically either in aggregated from or un-aggregated form based on the user's command. The user may continue to cause the graphical representation of the records to be switched back and forth between aggregated and un-aggregated form by repeatedly providing the command as needed.

It is not necessary for 100, 110, 120, 130, and 140 to be performed always in the order described above. As explained above, 100 is optional and in one embodiment, the multi-dimensional records may not be represented graphically in un-aggregated form initially. In another embodiment, after the aggregation of the records at 120, the records may be represented graphically in aggregated form to show the result of the aggregation automatically, without requiring the user to provide any command. Thereafter, the user may still choose to cause the graphical representation of the records to be switched back and forth between aggregated and un-aggregated form, as described in 130 and 140.

In another embodiment, the user may choose to graphically represent the records in different types of aggregated form, again by providing a command to indicate which aggregation type is preferred. The user may cause the graphical representation of the records to be switched among un-aggregated form and various types of aggregated form for easy comparison.

As will be understood, 100, 110, 120, 130, and 140 may be implemented as a software program. For example, an existing graphical library, such as OpenGL or Java 3D, may be utilized in displaying the data points in various graphical formats and providing the necessary graphical and image functionalities. Data structures such as arrays or sets may be used to represent the data points in the dataset.

In addition, a graphical user interface may be implemented to provide the user the necessary controls to graphically display those multi-dimensional records of interest, to specify bin or group ranges and aggregation types, and to cause the graphical display to be switched between un-aggregated data display and aggregated data display. The actual layout and design of the user interface may vary depending on user and/or product design preferences. FIGS. 2A-2B illustrate a sample user interface that enables the user to control the representation of the multi-dimensional records from a dataset.

In this sample user interface, the user is able to choose which dimension of the records is to be represented by the x-axis 210, the y-axis 220, and the z-axis 230, as well as to specify which type of bin or group 240 is to be used for aggregation. Of course, additional graphical characteristics may also be included in the user interface so that the user may choose them to represent additional dimensions of the records. In addition, a switch button 251 is provided so that the user may cause the display to be switched between representing un-aggregated data values of the records and representing aggregated data values of the records with a click of the mouse.

In the example shown in FIG. 2A, the user has chosen the x-axis to represent "Age" 211 and the y-axis to represent "Monthly Income" 221. The z-axis 230 is not used, so the scatter plot is a two-dimensional plot. For x-axis ("Age"), the aggregation type is the mean value of the ages within each group. For y-axis ("Monthly Income"), the aggregation type is the maximum value of the monthly incomes within each group. The user has chosen "Gender" as the basis for aggregation, so there are two groups: one for male and one for female.

In the example shown in FIG. 2B, the user has chosen the x-axis to represent "Age" 211, the y-axis to represent "Monthly Income" 221, and the z-axis to represent "Monthly Spending" 231. In this case, the scatter plot is a three-dimensional plot. For x-axis ("Age"), the aggregation type is the mean value of the ages within each group. For y-axis ("Monthly Income"), the aggregation type is the maximum value of the monthly incomes within each group. For z-axis ("Monthly Spending"), the aggregation type is the minimum value of the monthly spending within each group. The user has chosen "Age" equally divided into five ranges (equal width 5) as the basis for aggregation, so there are five groups.

It may be helpful to further illustrate FIG. 1 with a specific example. The following Table 2 is a sample representation of a large dataset. To simplify the description, only the records for the states of CA, FL and NY are actually shown in Table 2. In Table 2, each row represents a particular record, and each column represents a dimension within the record. In this example, each record represents a customer and is identified by a unique identification (ID) number in the first column.

The second column of the table represents each customer's age. The third column represents each customer's gender. The fourth column represents each customer's geographical location in terms of which state the customer is located. The fifth column represents each customer's monthly income. And the sixth column represents the amount each customer spends in a month.

TABLE 2

| Record ID | Age | Gender | Geographical Location | Monthly Income | Monthly Spending |
|---|---|---|---|---|---|
| 0,000,001 | 50 | M | NY | 12,250 | 6,200 |
| 0,000,002 | 20 | F | CA | 5,750 | 4,000 |
| 0,000,003 | 42 | M | FL | 8,000 | 4,500 |
| ... | | | | | |
| 0,023,962 | 68 | M | FL | 4,500 | 4,000 |
| 0,023,963 | 45 | F | FL | 15,250 | 12,000 |
| ... | | | | | |
| 0,553,015 | 24 | F | NY | 3,500 | 2,000 |
| 0,553,016 | 45 | M | CA | 9,750 | 7,300 |
| 0,553,017 | 38 | M | NY | 8,750 | 6,000 |
| 0,553,018 | 29 | F | NY | 7,750 | 7,000 |
| 0,553,019 | 55 | F | FL | 7,000 | 3,100 |
| ... | | | | | |
| 1,512,528 | 26 | F | CA | 9,250 | 6,200 |
| 1,512,529 | 34 | F | CA | 6,500 | 3,000 |
| ... | | | | | |

TABLE 2-continued

| Record ID | Age | Gender | Geographical Location | Monthly Income | Monthly Spending |
|---|---|---|---|---|---|
| 2,164,274 | 48 | M | NY | 4,000 | 3,500 |
| ... | | | | | |
| 3,513,529 | 45 | M | FL | 1,000 | 1,000 |
| 3,513,530 | 20 | F | FL | 1,000 | 900 |
| 3,513,531 | 66 | M | CA | 8,000 | 7,000 |

Figure 3A:
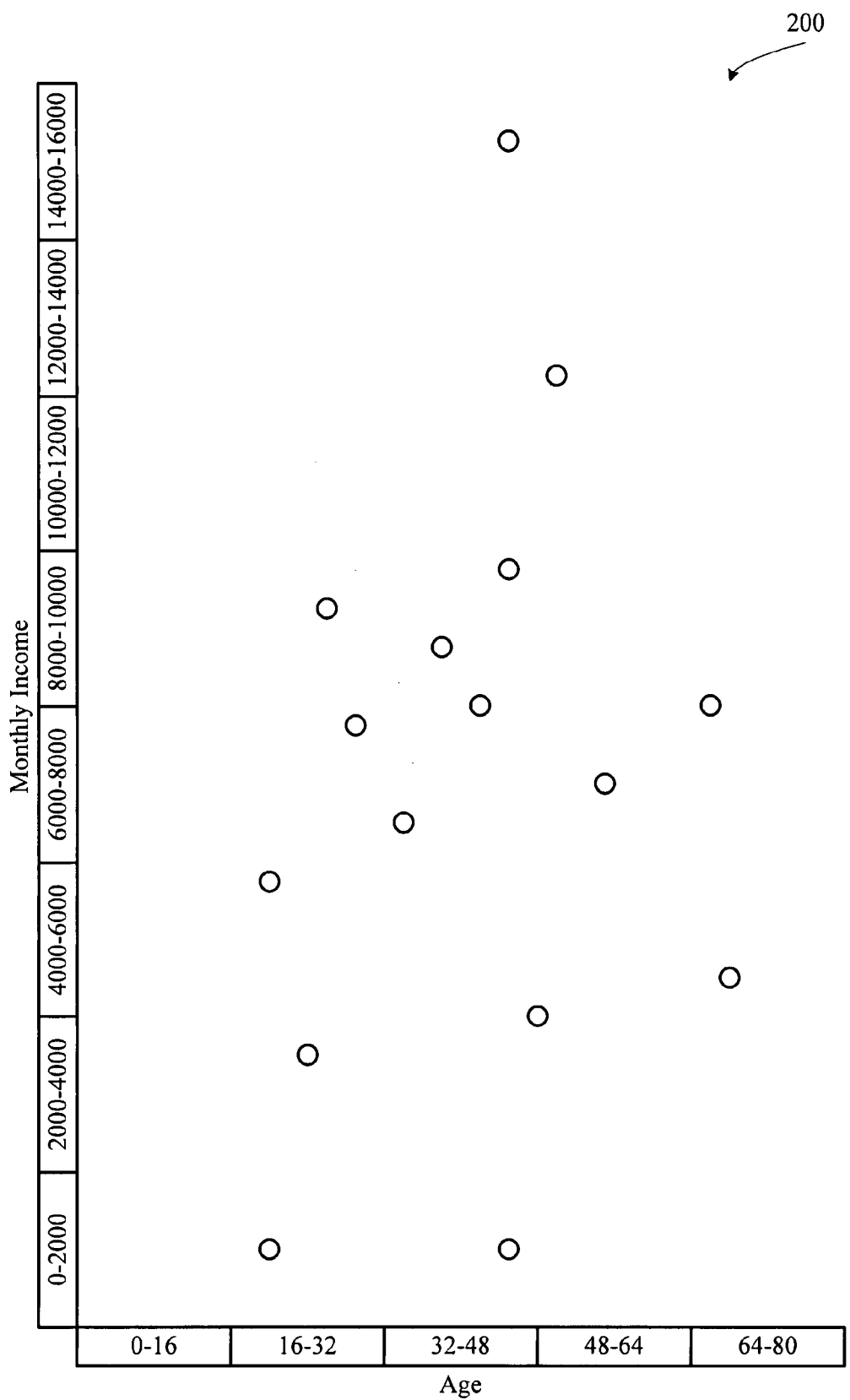
FIG. 3A illustrates a scatter plot that displays a subset of the multi-dimensional records from a dataset in un-aggregated form.

Assume that the user has chosen for the x-axis of a scatter plot to represent the "Age" dimension and the y-axis to represent the "Monthly Income" dimension of the dataset shown in Table 2. FIG. 3A illustrates a scatter plot that displays a subset of the multi-dimensional records from a large dataset in un-aggregated form, which corresponds to the data values shown in Table 2. Each data point in FIG. 3A provides an indication of a customer's age versus that customer's monthly income.

In addition, assume that the user has chosen the "Geographical Location" dimension as the group basis. Thus, there are three groups: CA, NY, and FL, because the customers in Table 2 are located from these three states. Table 3 shows the customers that belong to the CA group.

TABLE 3

CA Group

| Record ID | Age | Gender | Geographical Location | Monthly Income | Monthly Spending |
|---|---|---|---|---|---|
| 0,000,002 | 20 | F | CA | 5,750 | 4,000 |
| 0,553,016 | 45 | M | CA | 9,750 | 7,300 |
| 1,512,528 | 26 | F | CA | 9,250 | 6,200 |
| 1,512,529 | 34 | F | CA | 6,500 | 3,000 |
| 3,513,531 | 66 | M | CA | 8,000 | 7,000 |

Table 4 shows the customers that belong to the NY group.

TABLE 4

NY Group

| Record ID | Age | Gender | Geographical Location | Monthly Income | Monthly Spending |
|---|---|---|---|---|---|
| 0,000,001 | 50 | M | NY | 12,250 | 6,200 |
| 0,553,015 | 24 | F | NY | 3,500 | 2,000 |
| 0553,017 | 38 | M | NY | 8,750 | 6,000 |
| 0553,018 | 29 | F | NY | 7,750 | 7,000 |
| 2,164,274 | 48 | M | NY | 4,000 | 3,500 |

Table 5 shows the customers that belong to the FL group.

TABLE 5

FL Group

| Record ID | Age | Gender | Geographical Location | Monthly Income | Monthly Spending |
|---|---|---|---|---|---|
| 0,000,003 | 42 | M | FL | 8,000 | 4,500 |
| 0,023,962 | 68 | M | FL | 4,500 | 4,000 |
| 0,023,963 | 45 | F | FL | 15,250 | 12,000 |
| 0553,019 | 55 | F | FL | 7,000 | 3,100 |
| 3,513,529 | 45 | M | FL | 1,000 | 1,000 |
| 3,513,530 | 20 | F | FL | 1,000 | 900 |

Further assume that the user has chosen "mean" as the aggregation type for the x-axis ("Age") and "maximum" as the aggregation type for the y-axis ("Monthly Income").

Thus, for the CA group, the mean age is 38.2, and the maximum monthly income is 9,750. For the NY group, the mean age is 37.8, and the maximum monthly income is 12,250. And for the FL group, the mean age is 45.83, and the maximum monthly income is 12,000.

Figure 3B:
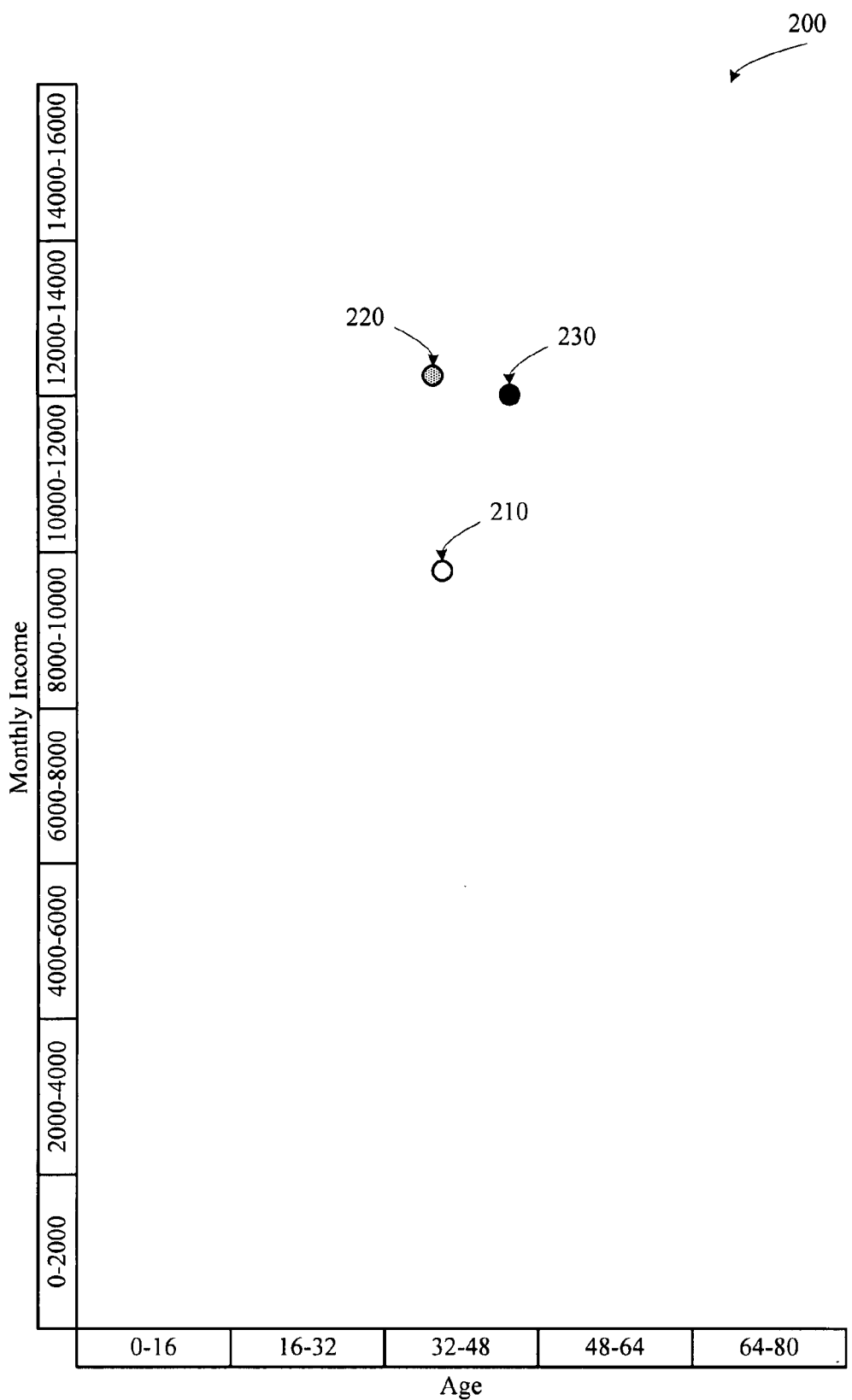
FIG. 3B illustrates a scatter plot that displays a subset of the multi-dimensional records from a dataset in aggregated form.

FIG. 3B illustrates a scatter plot that displays a subset of the multi-dimensional records from a large dataset in aggregated form, which corresponds to the three sets of the aggregated data described above. Point 210 represents the CA group. Point 220 represents the NY group. Point 230 represents the FL group. A graphical characteristic, such as color, size, label, legend, etc., may be used to distinguish each group. The user may specify which graphical characteristic to use for distinguishing the groups.

The user may choose to cause the display to be switched between the representation of the un-aggregated data values of the records shown in FIG. 3A and the representation of the aggregated data values of the records shown in FIG. 3B. This may be done by providing a command to switch between the two forms of displays.

Figure 4:
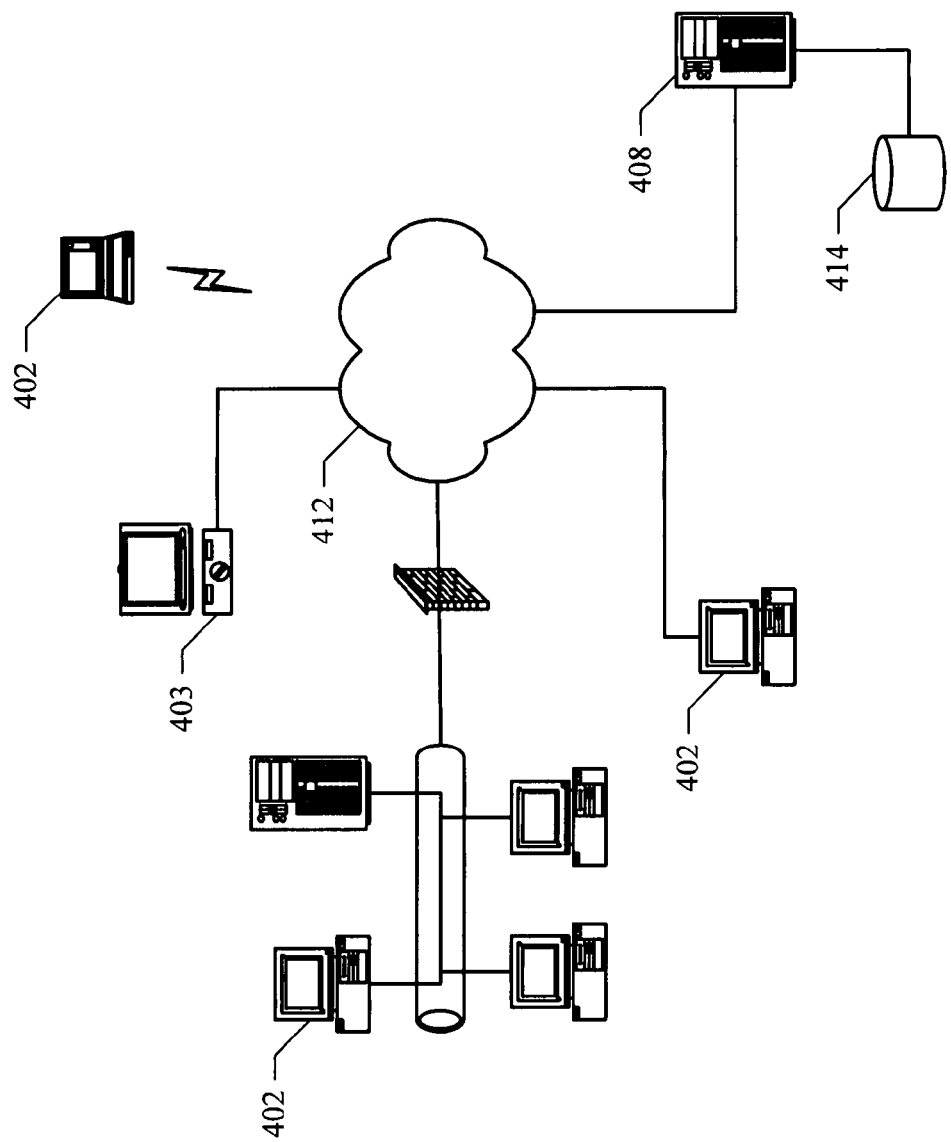
FIG. 4 is a simplified diagram of a network environment in which specific embodiments of the present invention may be implemented.

The method described above in FIG. 1 may be carried out, for example, in a programmed computing system. FIG. 4 is a simplified diagram of a network environment in which specific embodiments of the present invention may be implemented. The various aspects of the invention may be practiced in a wide variety of network environments (represented by network 412) including, for example, TCP/IP-based networks, telecommunications networks, wireless networks, etc. In addition, the computer program instructions with which embodiments of the invention are implemented may be stored in any type of computer-readable media, and may be executed according to a variety of computing models including, for example, on a stand-alone computing device, or according to a distributed computing model in which various of the functionalities described herein may be effected or employed at different locations.

According to various embodiments, the multi-dimensional records that belong to datasets may be stored in a database 414. Users may access datasets via the network using different methods, such as from computers 402, 403 connected to the network 412.

The software program implementing various embodiments may be executed on the server 408. Alternatively, the software program may be executed on the users' computers 402, 403. The graphical representation of the records may be displayed on the users' computer screens, and the users may interact with the records through the user interface provided by the software program.

While this invention has been described in terms of several preferred embodiments, there are alterations, permutations, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A computer-implemented method, comprising:
   receiving a plurality of records of a dimensionally-modeled fact collection;
   graphically representing the values of the records in un-aggregated form in a user interface;
   providing elements in the user interface which enable a user to specify an aggregation specification, wherein the aggregation specification defines a plurality of different aggregation groups into which the plurality of records are divided, the aggregation specification further defining an aggregation type corresponding to an aggregation technique by which the records of each aggregation group are aggregated;

aggregating the plurality of records in accordance with the aggregation specification, wherein the aggregating includes, for each of the aggregation groups, generating a summarized value for each of one or more dimensions of each group of records, the generated summarized value representing an aggregate of values at the one or more dimensions of the records of each group;

graphically representing in the user interface the values of the records in aggregated form by graphically representing each generated summarized value;

providing a toggle element in the user interface which allows the user to switch between viewing the records in un-aggregated form and aggregated form; and causing the graphical representation of the records to be switched between aggregated form and un-aggregated form based on a user indication using the toggle element.

2. The computer-implemented method, as recited in claim 1, wherein the aggregation type is at least one type selected from the group consisting of maximum, minimum, mean, sum, and count.

3. The computer-implemented method, as recited in claim 1, wherein each of the plurality of records comprises a plurality of dimensions.

4. The computer-implemented method, as recited in claim 3, further comprising:
prior to aggregating the plurality of records in accordance with the aggregation specification, graphically representing the records such that at least one dimension of the records is represented in un-aggregated form.

5. The computer-implemented method, as recited in claim 4, wherein an aggregation type is associated with each dimension of the records that is represented in un-aggregated form, and aggregating a plurality of records in accordance with the aggregation specification comprises aggregating each dimension of the records that is represented in un-aggregated form in accordance with the aggregation specification and the corresponding aggregation type.

6. The computer-implemented method, as recited in claim 1, wherein the user indication to cause the switching between graphically representing the records in aggregated form and un-aggregated form is one selected from the group consisting of a button click, a check box selection, a mouse click, and a user action.

7. The computer-implemented method, as recited in claim 1, further comprising:
graphically distinguishing the records represented in aggregated form in accordance with the aggregation specification.

8. The computer-implemented method, as recited in claim 7, wherein graphically distinguishing the records represented in aggregated form in accordance with the aggregation specification comprises graphically representing the records belonging to different groups using at least one selected from the group consisting of different colors, different shapes, different sizes, and different labels.

9. A computer program product comprising at least one non-transitory computer-readable medium having a plurality of computer program instructions stored therein, which are operable to cause at least one computing device to:
receive a plurality of records of a dimensionally-modeled fact collection;
graphically represent the values of the records in un-aggregated form in a user interface;
provide elements in the user interface which enable a user to specify an aggregation specification, wherein the aggregation specification defines a plurality of different aggregation groups into which the plurality of records are divided, the aggregation specification further defining an aggregation type corresponding to an aggregation technique by which the records of each aggregation group are aggregated;
aggregate the plurality of records in accordance with the aggregation specification,
wherein the aggregating includes, for each of the aggregation groups, generating a summarized value for each of one or more dimensions of each group of records, the generated summarized value representing an aggregate of values at the one or more dimensions of the records of each group;
graphically represent in the user interface the values of the records in aggregated form by graphically representing each generated summarized value;
provide a toggle element in the user interface which allows the user to switch between viewing the records in unaggregated form and aggregated form; and
cause the graphical representation of the records to be switched between aggregated form and un-aggregated form based on a user indication using the toggle element.

10. The computer program product, as recited in claim 9, wherein the aggregation type is at least one type selected from the group consisting of maximum, minimum, mean, sum, and count.

11. The computer program product, as recited in claim 9, wherein each of the plurality of records comprises a plurality of dimensions.

12. The computer program product, as recited in claim 11, wherein the computer program instructions are further operable to cause the at least one computer device to:
prior to aggregating the plurality of records in accordance with the aggregation specification, graphically represent the records such that at least one dimension of the records is represented in un-aggregated form.

13. The computer program product, as recited in claim 12, wherein an aggregation type is associated with each dimension of the records that is represented in un-aggregated form, and aggregating a plurality of records in accordance with the aggregation specification comprises aggregating each dimension of the records that is represented in un-aggregated form in accordance with the aggregation specification and the corresponding aggregation type.

14. The computer program product, as recited in claim 9, wherein the user indication to cause the switching between graphically representing the records in aggregated form and un-aggregated form is one selected from the group consisting of a button click, a check box selection, a mouse click, and a user action.

15. The computer program product, as recited in claim 9, wherein the computer program instructions are further operable to cause the at least one computer device to:
graphically distinguish the records represented in aggregated form in accordance with the aggregation specification.

16. The computer program product, as recited in claim 15, wherein graphically distinguishing the records represented in aggregated form in accordance with the aggregation specification comprises graphically representing the records belonging to different groups using at least one selected from the group consisting of different colors, different shapes, different sizes, and different labels.

* * * * *